US012592144B2

(12) United States Patent (10) Patent No.: US 12,592,144 B2

Excoffier et al. (45) Date of Patent: Mar. 31, 2026

(54) METHOD FOR MONITORING OBJECTS COMPRISING, RESPECTIVELY, TAGS THAT BACKSCATTER AMBIENT SIGNALS

(71) Applicant: ORANGE, Issy-les-Moulineaux (FR)

(72) Inventors: David Excoffier, Chatillon (FR); Dinh Thuy Phan Huy, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 41 days.

(21) Appl. No.: 18/257,919

(22) PCT Filed: Nov. 3, 2021

(86) PCT No.: PCT/FR2021/051929

§ 371 (c)(1),
(2) Date: Jun. 16, 2023

(87) PCT Pub. No.: WO2022/129714

PCT Pub. Date: Jun. 23, 2022

(65) Prior Publication Data

US 2024/0054880 A1 Feb. 15, 2024

(30) Foreign Application Priority Data

Dec. 16, 2020 (FR) ...................................... 2013343

(51) Int. Cl.
*H04B 1/38* (2015.01)
*G08B 21/22* (2006.01)
*H04B 7/22* (2006.01)
*H04L 5/16* (2006.01)

(52) U.S. Cl.
CPC .............. *G08B 21/22* (2013.01); *H04B 7/22* (2013.01)

(58) Field of Classification Search
CPC ........ G08B 21/22; G08B 29/046; H04B 7/22; G06K 7/10465
USPC .......................... 375/219, 220, 211, 295, 316
See application file for complete search history.

(56) References Cited

U.S. PATENT DOCUMENTS

2012/0293307 A1* 11/2012 Djuric ................ G06K 7/10465
340/10.2
2019/0317206 A1 10/2019 Sundaresan et al.
2022/0076550 A1* 3/2022 Bergman ............. G08B 29/046

OTHER PUBLICATIONS

International Search Report dated Feb. 1, 2022 for corresponding International Application No. PCT/FR2021/051929, filed Nov. 3, 2021.

(Continued)

*Primary Examiner* — Phuong Phu
(74) *Attorney, Agent, or Firm* — Brian D. Kaul; Westman, Champlin & Koehler, P.A.

(57) ABSTRACT

A method for monitoring objects, the objects including, respectively, tags that backscatter ambient signals. The method is implemented by a receiver device and includes: receiving a first backscattered signal originating from a first object, the first backscattered signal corresponding to an ambient signal and including a message having an identification datum relating to the first object; and determining the desired presence or the undesired presence of the first object in a geographical area as a function of the identification datum relating to the first object. Use for systems for monitoring objects, for example to detect proximity between objects that should not be close to one another.

13 Claims, 5 Drawing Sheets

(56) References Cited

OTHER PUBLICATIONS

Written Opinion of the International Searching Authority dated Feb. 1, 2022 for corresponding International Application No. PCT/FR2021/051929, filed Nov. 3, 2021.

Vincent Liu et al., "Ambient backscatter", SIGCOMM, ACM, 2 Penn Plaza, Suite 701 New York NY 10121-0701 USA, Aug. 27, 2013 (Aug. 27, 2013), p. 39-50, XP058030632.

English translation of the Written Opinion of the International Searching Authority dated Feb. 1, 2022 for corresponding International Application No. PCT/FR2021/051929, filed Nov. 4, 2021.

* cited by examiner

1

METHOD FOR MONITORING OBJECTS COMPRISING, RESPECTIVELY, TAGS THAT BACKSCATTER AMBIENT SIGNALS

CROSS-REFERENCE TO RELATED APPLICATIONS

This application is a Section 371 National Stage Application of International Application No. PCT/FR2021/051929, filed Nov. 3, 2021, which is incorporated by reference in its entirety and published as WO 2022/129714 A1, on Jun. 23, 2022, not in English.

FIELD OF THE DISCLOSURE

The present invention relates to a method for monitoring objects, especially with a view to detecting the proximity of two objects, or to detecting the presence of an object in a geographical region.

In particular, the method is intended to detect the undesired proximity of two objects, or to detect the undesired presence of an object in a geographical region.

It further relates to a monitoring system implementing this method.

The invention is advantageously applicable to monitoring and tracing objects stored in containers or storage areas, especially with the aim of detecting the erroneous presence of an object in a given location or undesired proximity of objects.

BACKGROUND OF THE DISCLOSURE

It is known to monitor objects, for example with a view to tracing their movements and determining proximity between these objects should it arise. Various technologies may be used to trace objects. One widely used technology is the technology RFID (for "Radio Frequency Identification"). One known example of a monitoring system consists in deploying a set of passive RFID readers in a geographical region. Each RFID reader constantly irradiates, with a radio-frequency wave, one portion of the geographical region, with a view to detecting objects equipped with an RFID tag present in this portion of the geographical region. By virtue of this monitoring system, these objects may be traced in order, for example, to determine occurrences of object proximity. This monitoring system may be used in epidemic situations, to detect people carrying these objects who are located in proximity to one another.

Another monitoring system intended to trace people, and especially to monitor for potential proximity between people, uses mobile devices, such as smartphones, configured to communicate using the Bluetooth Low Energy (BLE) communication standard. In this monitoring system, the mobile devices constantly emit and listen, and must be connected to a central unit managing the tracing data via a BLE or Wi-Fi connection, or via a communication network such as a 4G network, a LoRaWAN network or any other type of communication network.

The equipment used in monitoring systems employing RFID or BLE technologies emits constantly and is expensive. Thus, monitoring objects using systems based on technologies of the aforementioned types leads to high power consumption, and the cost of implementation is high.

SUMMARY

The invention aims to improve the situation and provides a method for monitoring objects that is effective while decreasing power consumption.

To this end, the invention relates, according to a first aspect, to a method for monitoring objects, the objects respectively comprising tags backscattering ambient signals.

According to the invention, the monitoring method is implemented by a receiver device and comprises:

receipt of a first backscattered signal originating from a first object, the first backscattered signal corresponding to an ambient signal and comprising a message containing an identification datum relating to the first object; and determination of a desired presence or an undesired presence of said first object in a geographical region depending on the identification datum relating to the first object.

Thus, when the presence of an object in a geographical region is detected, it is determined whether the presence of this object is desired or undesired. The receiver device detects the presence of the object in the geographical region when it receives an ambient signal backscattered by the object comprising the tag backscattering the ambient signal. Once the presence of the object has been detected, the device determines, by means of the identification datum, whether the presence of the object in the geographical region is desired or not.

The geographical region corresponds to the geographical region in which the receiver device is located, or in other words the region surrounding the receiver device.

By virtue of the invention, an object present by mistake in a location or geographical region may be identified. In the same way, the desired presence of an object may be detected.

Determination of the desired or undesired presence of an object is very useful in respect of storage of objects, and especially when contact, or proximity, of certain objects must be avoided, for example in order to prevent dangerous situations from arising.

According to one feature, the monitoring method comprises receipt of a second backscattered signal originating from at least a second object, said second backscattered signal corresponding to an ambient signal and comprising a message containing an identification datum relating to said at least a second object, the desired or undesired presence of the first object in the geographical region further being determined depending on the identification datum relating to said at least a second object.

Thus, the second datum relating to the identification of said at least a second object is taken into account to determine whether the presence of the first object is desired or undesired.

It will be noted that identification data relating to both objects are taken into account. Thus, for example, the presence of an object may be undesirable in the presence of the other object, or in other words proximity of two objects (or a plurality of objects) may be undesired. It will be noted that the presence of an object may be undesirable in the presence of a plurality of objects. A typical example in which proximity of objects is monitored is storage of chemical substances. Specifically, proximity of certain chemical substances may present a danger.

Two (or more) objects are considered to be close to one another (or to be in proximity to one another) when they are present simultaneously in the same geographical region.

According to one feature, the determination of the desired or undesired presence comprises verification of the presence of the identification datum in a list of identification data and identification of the first object as being of desired presence or undesired presence depending on the result of the verification.

According to embodiments, the list of identification data may be a list of identification data relating to objects the presence of which in the geographical region is desired, or a list of identification data relating to objects the presence of which in the geographical region is undesired, or a list of identification data relating to objects the proximity of which to each other is undesired.

Thus, the determination of the desired or undesired presence of an object comprises verification of the identification data. For example, this verification may comprise consultation of a list of identification data to determine whether the identification datum relating to the object contained in the backscattered signal received by the receiver device is present in the list. Depending on the result of this verification, it is determined whether the presence of the object is desired or undesired.

It will be noted that the identification datum relating to an object may be a datum uniquely identifying the object (object identifier) or a datum uniquely identifying one portion of the object, for example a substance contained by the object.

According to one embodiment, the verification comprises consultation of a list of identification data relating to objects the presence of which in the geographical region is desired to verify whether the identification datum relating to the first object is found in the list.

If the result of the consultation is negative, i.e. if the identification datum is not found in the list, it is determined that the presence of the object is undesired. On the contrary, if the result of the consultation is positive, i.e. if the identification datum is found in the list, it is determined that the presence of the object is desired.

According to another embodiment, the verification comprises consultation of a list of identification data relating to objects the presence of which in the geographical region is not desired, to verify whether the identification data relating to the object are found in the list.

In this embodiment, if the result of the consultation is negative, i.e. if the identification datum is not found in the list, it is determined that the presence of the object is desired. On the contrary, if the result of the consultation is positive, i.e. if the identification datum is found in the list, it is determined that the presence of the object is not desired.

According to another embodiment, the verification comprises consultation of a list of identification data relating to objects proximity of which is not desired, to verify whether the identification data relating to the object are found in the list.

In this embodiment, if for two objects the result of the consultation is positive, i.e. if the identification data relating to these objects are found in the list, it is determined that the proximity of these objects is undesired. Thus, placing the two objects in proximity, for example for storage, must be avoided. Of course, the verification may be implemented for a number of objects greater than two. Generally, if the result of the verification is positive for a plurality of objects, putting these objects in proximity must be avoided.

Dangerous situations in which substances are mistakenly placed in proximity may be avoided. Furthermore, an object mistakenly stored in a geographical region may be detected.

In the case where the presence of identification data in a list of identification data is verified for two objects, if the identification datum relating to one of the two objects is not present in the list, it is determined that the proximity of these objects is possible. Thus, storage in proximity of these objects is possible. It will be noted that when the verification is implemented for a set of objects comprising objects that are greater than two in number, the absence from the list of the identification datum relating to an object does not mean that all the objects may be placed in proximity. Specifically, proximity is possible only between objects not in the list, storage thereof in proximity being possible.

According to one feature, the monitoring method comprises transmission to a monitoring server of said identification datum contained in the first backscattered signal.

Thus, the monitoring server may store the identification data of the objects detected by the receiver device. The monitoring server is linked to the receiver device via a communication network. This monitoring server may be a processing unit centrally managing monitoring of objects.

According to one feature, the monitoring method comprises transmission to the monitoring server of said identification datum contained in the second backscattered signal.

According to one feature, the monitoring method comprises generation of an alert message intended to warn of the undesired presence of the first object in the geographical region.

According to embodiments, the information message may be generated by the receiver device, by the monitoring server or by both.

According to one feature, the monitoring method comprises generation of an alert message intended to warn of the undesired proximity of the first object and of said at least a second object.

According to one feature, the alert messages may be addressed to user terminals with a view to being rendered on the user interface of the terminal.

The information message may also be rendered on the receiver device and/or the monitoring server.

The features of the monitoring method presented below may be implemented alone or in combination with one another.

The present invention relates, according to a second aspect, to a receiver device comprising:

a reception module configured to receive backscattered signals respectively originating from objects comprising tags backscattering ambient signals, the backscattered signals respectively comprising identification data relating to said objects;

a determination module that determines, depending on the received identification data relating to said objects, a desired presence or an undesired presence of said objects in a geographical region or an undesired proximity of at least two objects.

The present invention relates, according to a third aspect, to a system for monitoring objects respectively comprising tags backscattering ambient signals. The system comprises an emitter device that emits ambient signals and a receiver device according to the invention and implementing the monitoring method according to the invention.

The present invention relates, according to a fourth aspect, to a computer program able to be implemented on a receiver device, the program comprising code instructions for implementing the steps of the monitoring method according to the invention, when it is executed by a processor.

The present invention relates, according to a fifth aspect, to a data medium readable by a processor in a receiver device, on which is stored a computer program comprising code instructions for implementing the steps of the monitoring method according to the invention, when it is executed by the processor.

The receiver device, the monitoring system, the computer program and the data medium have features and advantages analogous to those described above in relation to the monitoring method.

BRIEF DESCRIPTION OF THE DRAWINGS

Other particular features and advantages of the invention will become more clearly apparent in the following description.

In the appended drawings, which are given by way of non-limiting examples.

DETAILED DESCRIPTION OF ILLUSTRATIVE EMBODIMENTS

The invention is applicable to systems for monitoring objects, particularly with a view to detecting proximity between objects that must not be close to one another.

As will be described in detail below, the monitoring system according to the invention uses ambient backscatter or backscatter of ambient signals emitted by an emitter device that emits radio-frequency signals.

Figure 1:
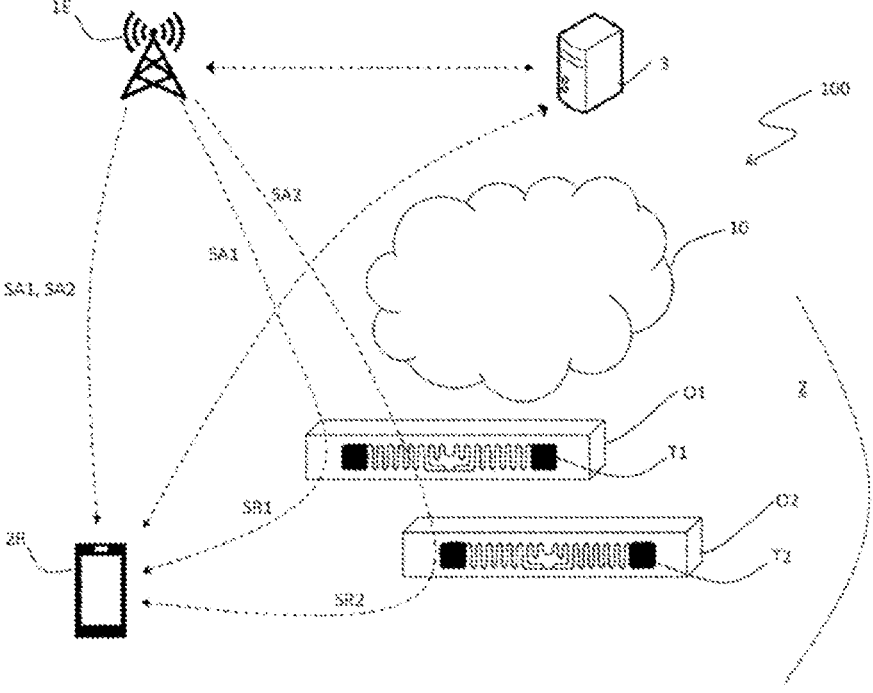
FIG. 1 is a schematic showing a monitoring system according to a first embodiment of the invention.

FIG. 1 shows a monitoring system 100 according to a first embodiment of the invention.

In this embodiment, the system comprises an emitter device 1E configured to emit a radio-frequency signal, called the "ambient signal". In one embodiment, the emitter device 1E is network equipment, such as a base station allowing communication between a terminal 2R and a mobile telephone network 10, such as a 4G or 5G network. In other words, the radio-frequency signal or ambient signal is a telephone signal, for example a 4G or 5G signal. The base station (or emitter device) 1E is configured to emit signals to the terminal 2R and to receive signals from the terminal 2R.

It will be noted that the radio-frequency signal may be different, for example a 2G, 3G, 5G or 5G mobile telephone signal, a Wi-Fi signal, a Bluetooth signal or any other type of radio-frequency signal.

Thus, according to other embodiments, the emitter device 1E may be different. By way of completely non-limiting example, it may be integrated into a residential gateway intended to connect an access network to a packet-switched network, such as the Internet. The gateway may communicate with the terminal according to wireless communication standards such as Wi-Fi or Bluetooth standards, inter alia.

The terminal 2R may be a smartphone, a tablet, a personal computer or any other communicating object. The terminal 2R is a receiver device 2R configured to receive ambient signals. The terminal 2R may be mobile in a geographic region Z or fixed.

It will be noted that the emitter device 1E and the receiver device 2R may take different forms. Specifically, the base station and terminal are non-limiting examples.

In the described embodiment, the base station 1E emits an ambient signal that may be a communication or signaling signal.

It will be noted that in the description of this embodiment, the emitter device and the base station are equivalent and have been designated by the same reference 1E. Likewise, the receiver device and the terminal are equivalent in this embodiment and have been designated by the same reference 1R.

In the embodiment of FIG. 1, two objects O1, O2 are present in the geographical region Z. Each object O1, O2 comprises a backscatter tag T1, T2 configured to backscatter ambient signals emitted by the emitter device 1E (here the base station 1E) to the receiver device 2R (here the terminal 2R).

The geographical region Z corresponds to the geographical region in which the terminal 2R is located, or in other words the region surrounding the terminal 2R. This region Z may for example be a storage space in a closed or open environment. By way of illustration, the storage space Z may be a space located in a hangar, a building, on a tract of land, etc.

In particular, the geographical region Z corresponds to a geographical region around the terminal 2R in which the terminal 2R is able to detect objects, and in particular the backscatter tags T1, T2. A backscatter tag (and therefore the object bearing it) is considered to have been detected by the receiver device 2R when it receives an ambient signal backscattered by the backscatter tag, of a predefined power. In other words, an ambient signal SR1, SR2 backscattered by a backscatter tag T1, T2 is considered to have been received (and therefore the backscatter tag T1, T2 detected) when the power of the backscattered ambient signal SR1, SR2 on its receipt by the receiver device 2R is equal to or greater than a detection threshold value. Below this detection threshold value, the backscattered ambient signal SR1, SR2 is considered not to have been received by the receiver device 2R, and, consequently, the backscatter tag T1, T2 is not detected.

Thus, the geographical region Z around the terminal 2R corresponds to a geographical region in which the power of the received backscattered ambient signals SR1, SR2 has a value equal to or greater than the predefined value.

It will be noted that, for a given type of backscatter tag and reception module in the receiver device, the geographical region Z is spatially limited by this detection threshold value.

It will further be noted that those skilled in the art have the necessary knowledge to determine the geographical region Z for a given type of backscatter tag and reception module.

The number of objects bearing backscatter tags T1, T2 may be different. Furthermore, other terminals could be present in the geographical region Z and implement the invention.

The objects O1, O2 are objects to be monitored by the monitoring system 100. In particular, the monitoring system 100 is configured to verify whether the presence of the objects O1, O2 in the geographical region Z is desired or undesired.

In this geographical region Z, the presence of certain objects O1, O2 is desired, i.e. their presence is permitted or authorized, for example for their storage. In contrast, the presence of other objects O1, O2 is undesired, i.e. their presence, for example for their storage, in the geographical region Z is not permitted. According to embodiments, the presence of the object is not permitted on account of the geographical region Z. For example, it may be desired for all the objects stored in a geographical region to be of the same type. Thus, the presence of an object of a different type would not be desired. According to other embodiments, simultaneous presence of two objects in a geographical region may not be desired. It may be a question of objects proximity of which is to be avoided, for example chemical substances that must be kept away from each other as placing them in contact or in proximity could be dangerous.

The emitter device 1E and the receiver device 2R are configured to communicate with a monitoring server 3 via the communication network 10. This monitoring server 3 may be a processing unit centrally managing monitoring of objects.

Figure 3A:
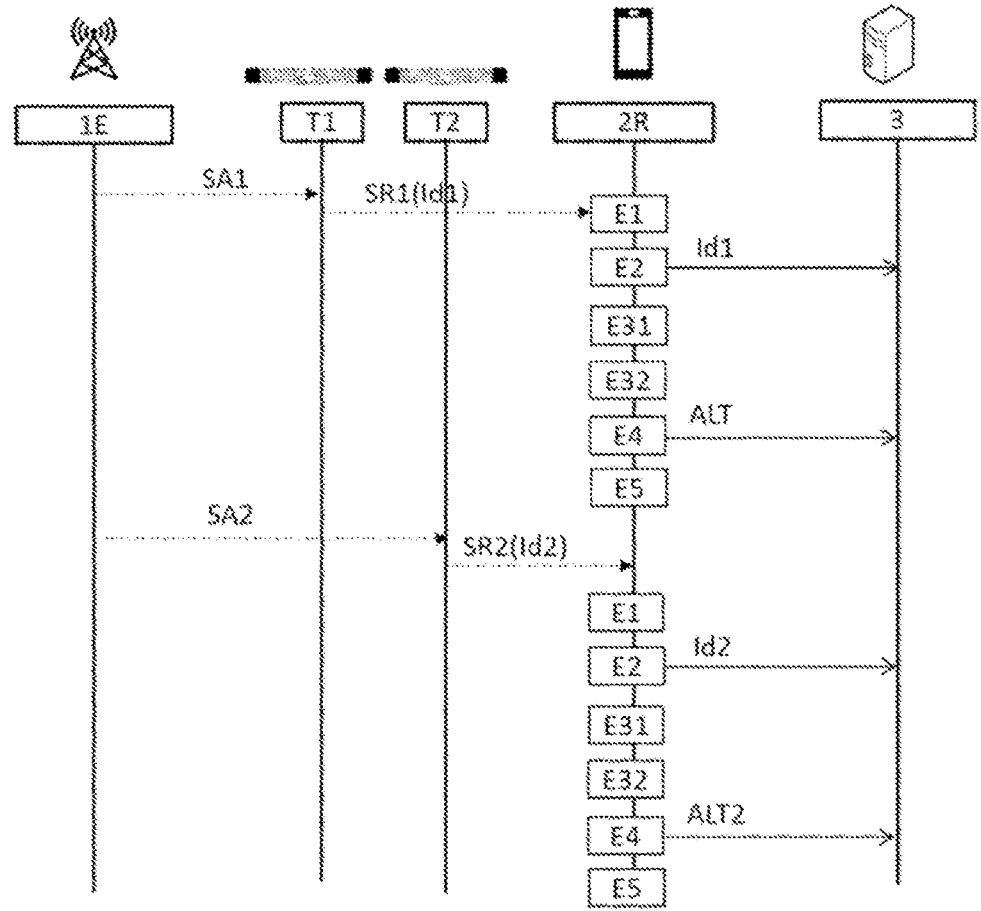
FIG. 3*a* illustrates steps of a monitoring method according to one embodiment of the invention in the form of exchanges between the entities of FIG. 1.

FIG. 3a illustrates steps of the monitoring method according to a first embodiment of the invention, in the form of exchanges between the entities described with reference to FIG. 1. In this embodiment, the monitoring method uses downlink communications between the base station (emitter device) 1E and the terminal (receiver device) 2R.

According to one embodiment, the steps of the monitoring method are implemented by the receiver device or terminal 2R.

As described above, the emitter device or base station 1E is configured to emit ambient signals SA1, SA2. Each backscatter tag T1, T2 is configured to re-emit the ambient signals SA1, SA2 to the receiver device or terminal 2R. These re-emitted ambient signals SA1, SA2 are called backscattered signals SR1, SR2.

In FIG. 3a, two ambient signals SA1, SA2 and two backscattered signals SR1, SR2 have been shown. A first tag T1 re-emits a first ambient signal S1, i.e. backscatters a first backscattered signal SR1, and a second tag T2 re-emits a second ambient signal S2, i.e. backscatters a second backscattered signal SR2. These two ambient signals SA1, SA2 are for example emitted at different times.

Of course, the two tags T1, T2 may re-emit the same ambient signal SA1, SA2.

The receiver device or terminal 2R is configured to receive the backscattered signals SR1, SR2. In the embodiment shown, the terminal 2R receives E1 the first backscattered signal SR1 originating from the first object O1, and in particular from the first tag T1. The first backscattered signal SR1 comprises a message, this message containing an identification datum Id1 relating to the first object O1.

According to embodiments, the identification datum Id1 relating to the first object O1 may be an identification datum uniquely identifying the object, or one portion of the object O1. For example, the object may be a container and the identification datum relating to the object a datum identifying its content.

By way of example, the identification datum corresponds to a sequence of alphanumeric characters.

Thus, the receiver device or terminal 2R receiving the first backscattered signal SR1 detects the first object O1. In other words, the terminal 2R is aware of the presence of the first object O1 in the geographical region Z.

In one embodiment, the terminal 2R obtains the identification datum relating to the first object O1 and stores it in a list listing the objects present in the geographical region Z.

In an embodiment such as the one shown in FIG. 3a, the terminal 2R emits E2 to the monitoring server 3, the identification datum Id1 relating to the first object O1, i.e. the identification datum Id1 contained in the first backscattered signal SR1.

Once the receiver device or terminal 2R has detected the first object O1, it implements the determination E3 of a desired presence or of an undesired presence of the first object O1 in the geographical region Z. In other words, the terminal 2R determines E3 whether the presence of the first object O1 is authorized or whether the presence of the first object O1 is not authorized.

The determination E3 is implemented depending on the identification datum Id1 relating to the first object O1.

In one embodiment, the determination E3 of the desired or undesired presence is implemented by verifying E31 whether the identification datum is present in a list L of identification data of objects.

According to one embodiment, this list L of identification data of objects is stored beforehand in the terminal 2R. The list L of identification data may also be stored in the monitoring server 3.

In the embodiment shown, the terminal 2R implements the verification E31 of the presence of the identification datum Id1 in the list L of identification data. In other embodiments (not shown), this verification is implemented by the monitoring server 3.

According to embodiments, the list L of identification data may take different forms. According to one embodiment, a first list L1 of identification data lists identification data relating to objects the presence of which in the geographical region Z is undesired.

Thus, in practice, in this embodiment, a consultation is carried out to see whether the identification data Id1 relating to the first object O1 are found in the list L1 of identification data.

If the result of the consultation E31 is negative, i.e. if the identification datum Id1 is not found in the list L1 of identification data, the first object O1 is identified as being of desired presence. Thus, it is determined that the presence of the first object O1 is desired.

In contrast, if the result of the consultation E31 is positive, i.e. if the identification datum Id1 is found in the list L1 of identification data, the first object O1 is identified E32 as being of undesired presence. Thus, it is determined that the presence of the first object O1 is not desired.

According to another embodiment, a second list L2 of identification data lists identification data relating to objects the presence of which in the geographical region Z is desired.

In this embodiment, if during the consultation E31 of the list L2 of identification data the result is negative, i.e. if the identification datum Id1 is not found in the list L2 of identification data, the first object O1 is identified as being of undesired presence. Thus, it is determined that the presence of the first object O1 is not desired.

In contrast, if the result of the consultation E31 is positive, i.e. if the identification datum Id1 is found in the list L2 of identification data, the first object O1 is identified E32 as being of desired presence. In other words, it is determined that the presence of the first object O1 is desired.

When it is determined that the presence of the first object O1 is undesired, the terminal 2R generates E4 an alert message intended to warn of the undesired presence of the first object O1 in the geographical region Z.

In one embodiment, the alert message ALT is rendered on the terminal 2R to warn a user of the terminal 2R of the undesired presence of the first object O1.

In other embodiments, the alert message ALT may be addressed to other terminals and/or to the monitoring server in order to be rendered thereby.

When it is determined E3 that the presence of the first object O1 is desired, an information message MESS may be generated and then rendered on the terminal and/or addressed to other terminals and/or to the monitoring server, to be rendered thereby.

According to embodiments (not shown), at least one among the determination E3 (verification E31 and identification E32), the generation E4 and the rendition E5 may be implemented by the monitoring server 3.

In one embodiment, the verification of the presence of the identification datum in the list L1, L2 of identification data may be implemented in the monitoring server 3. The result of this verification may be addressed to the terminal 2, so that the identification E32 of the first object may be implemented in the terminal 2, or the identification E32 of the first object may also be implemented by the monitoring server 3.

Next, the monitoring server 3 may itself implement the generation E4 of the alert message or of the information message and its rendition E5, and/or address it to the terminal 2R (and/or to other terminals) for rendition.

According to one embodiment (not shown), the alert message ALT or the information message MESS may be addressed to the emitter device 1E.

When, as illustrated by FIG. 3a, the terminal 2 detects a second object O2 present in the geographical region Z, i.e. when it receives E2 a second backscattered signal SR2 originating from the second object O2, it determines E3 whether the presence of the second object is desired or undesired in the geographical region Z.

The backscattered signal comprises a message containing an identification datum Id2 relating to the second object O2.

According to one embodiment, the terminal 2R (and/or the monitoring server 3) implements the steps E1-E5 described above regarding detection of the first object O1 in a similar way for the second object O2.

It will be noted that in the described embodiment, the first object O1 is considered to be detected at a first time, this object being the only object detected at this first time, and the second object is considered to be detected at a later time. In this embodiment, the presence of these objects in the geographical region Z is concomitant.

In other embodiments, the first object and the second object may be detected simultaneously.

In this embodiment, in which more than one object is detected, the determination of the desired or undesired presence of the objects O1, O2 in the geographical region Z, may be conditional upon concomitant presence of the objects in the geographical region Z. In other words, simultaneous presence of the objects in the geographical region possibly being incompatible, this incompatibility is taken into account in the determination of the desired or undesired presence of the objects O1, O2.

In the embodiment described below, the verification of the presence of identification data in the list L, L1, L2 of identification data is implemented for the first object O1 and for the second object O2. As indicated below, according to embodiments, the list L of identification data used may be a list L1 of identification data relating to objects of undesired presence in the geographical region Z or the list L2 of identification data relating to objects of desired presence in the geographical region Z.

In another embodiment, a third list L3 of identification data may comprise identification data relating to objects the proximity of which to one another is undesired. In this embodiment, the verification of the presence of the identification data Id1, Id2 of the first object O1 and of the second object O2 respectively comprises consultation of this list of identification data.

In this embodiment, if during the verification E31 in the list, the two objects O1, O2 are found in the list L3 of identification data, these objects O1, O2 must not be placed in proximity to one another. Thus, they are identified as objects that cannot be placed in proximity to one another. Therefore, it is determined that proximity of these objects is undesired, or in other words that they cannot be present simultaneously in the geographical region Z.

If the identification datum Id1, Id2 relating to at least one of two objects O1, O2 is not present in the list L3, it is determined that proximity of these objects O1, O2 is possible. In other words, the objects O1, O2 are identified as being able to be placed in proximity. Thus, storage in proximity of these objects is possible.

Figure 2:
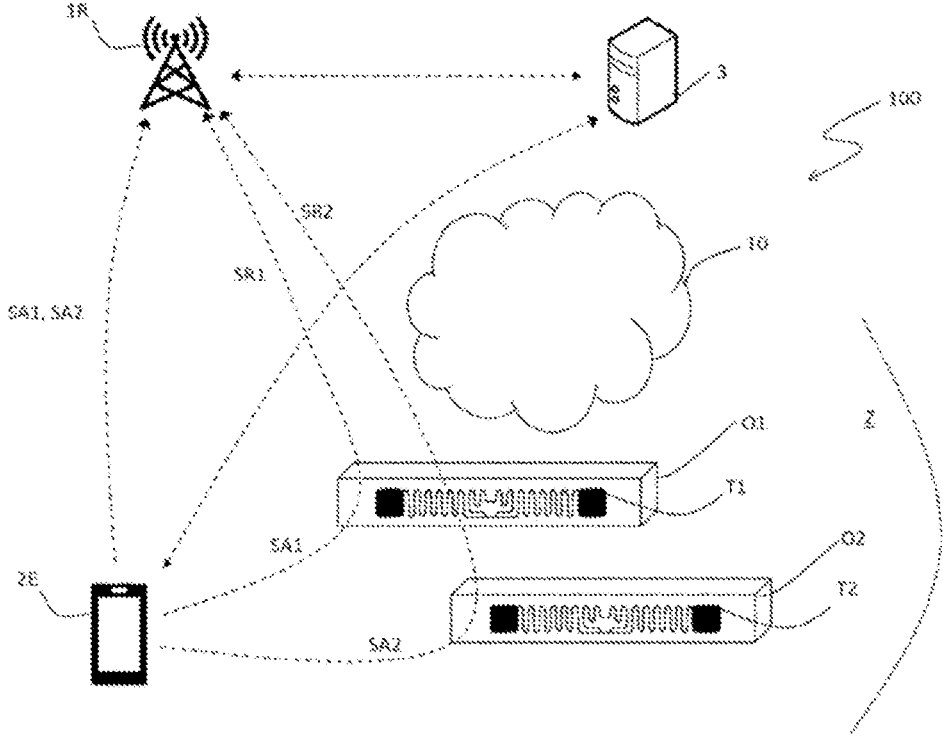
FIG. 2 is a schematic showing a monitoring system according to a second embodiment of the invention.

FIG. 2 shows a monitoring system 100' according to a second embodiment of the invention.

The equipment of the monitoring system of this embodiment is similar to the equipment of the monitoring system of FIG. 1.

In this embodiment, the emitter device 2E configured to emit an ambient signal is a terminal 2E and the receiver device 1R configured to detect backscattered signals is a base station 1R.

The monitoring system according to this embodiment uses uplink communications between the terminal 2E and the base station 1R.

Just as for the first embodiment, the emitter device 2E is a smartphone, but may be a tablet, a personal computer or any other communicating object. The terminal may be mobile in a geographical region Z or fixed.

The receiver device 1R may be another network equipment such as a residential gateway intended to connect an access network to a packet-switched network, such as the Internet. The gateway may communicate with the terminal according to wireless communication standards such as Wi-Fi or Bluetooth standards, inter alia.

As for FIG. 1, the emitter device 2E and the receiver device 1R may take different forms. Specifically, the base station and terminal are non-limiting examples. Since this equipment is equivalent to that of the monitoring system of FIG. 1, it will not be described in detail here.

In the described embodiment, the terminal 2E emits an ambient signal, which may be a communication or signaling signal, to the base station 1R.

In the embodiment of FIG. 2, two objects O1, O2 are present in the geographical region Z. Each object O1, O2 comprises a backscatter tag T1, T2 configured to backscatter the ambient signal SA1, SA2 emitted by the emitter device 1 (here the terminal) to the receiver device 2 (here the base station 2R).

The geographical region Z corresponds to the geographical region in which the terminal 2E is located, or in other words the region surrounding the terminal 2E.

As mentioned with reference to FIG. 1, the number of objects bearing backscatter tags T1, T2 may be different. Furthermore, other terminals could be present in the geographical region Z and implement the invention.

The objects O1, O2 are similar to those described with reference to FIG. 1.

Figure 3B:
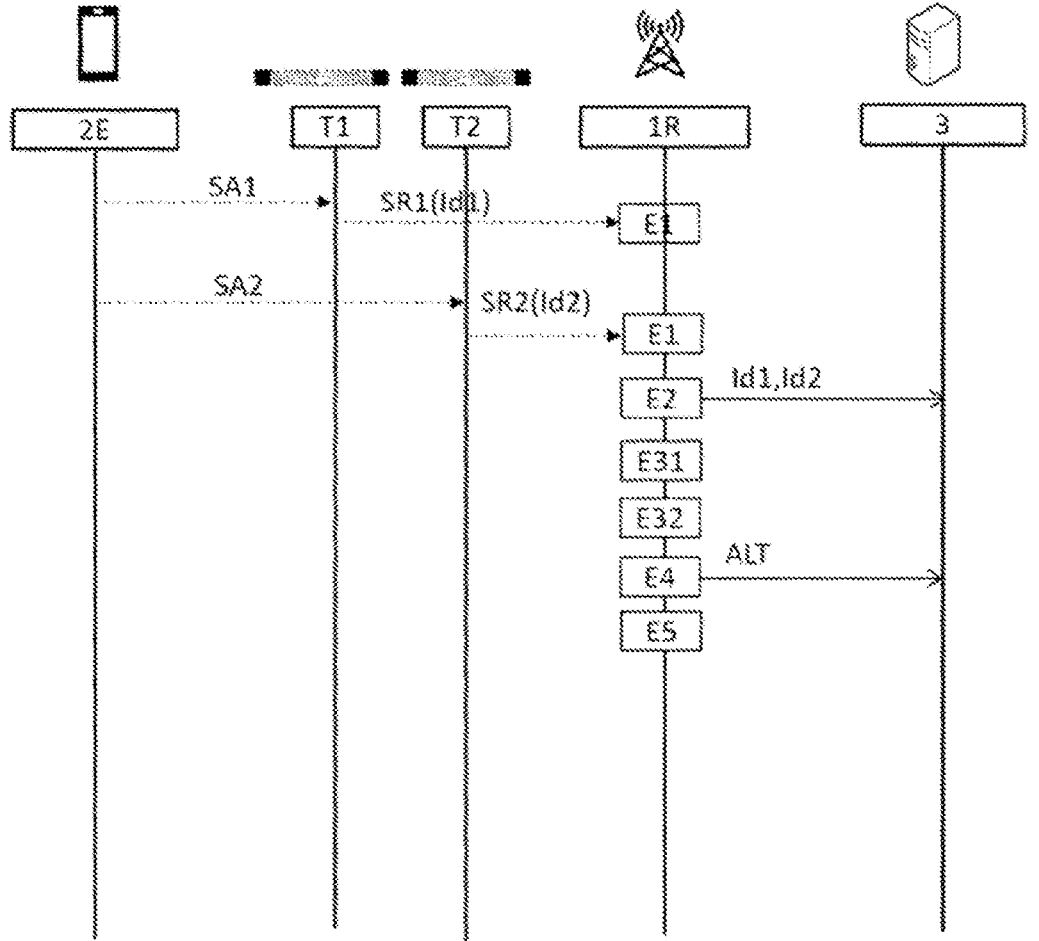
FIG. 3*b* illustrates steps of a monitoring method according to one embodiment of the invention in the form of exchanges between the entities of FIG. 2.

FIG. 3b illustrates steps of the monitoring method according to a second embodiment of the invention, in the form of exchanges between the entities described with reference to FIG. 2. In this embodiment, the monitoring method uses uplink communications between the terminal (emitter device) 2E and the base station (receiver device) 1R.

In this embodiment, the monitoring method is implemented by the base station 1E.

In this embodiment, two backscattered signals SR1, SR2 are received by the base station 1R. Once the two objects O1, O2 have been detected, in this embodiment, the determination E3 of the desired or undesired presence of the objects O1, O2 is implemented by verifying the presence of the identification data Id1, Id2 respectively relating to the objects O1, O2, in the third list L3 of identification data.

Of course, as indicated below, according to embodiments, the list L of identification data used may be a list L1 of identification data relating to objects of undesired presence in the geographical region Z or the list L2 of identification data relating to objects of desired presence in the geographical region Z.

In this embodiment, if during the verification E31 in the list, the two objects O1, O2 are found in the list L3 of identification data, these objects O1, O2 must not be placed in proximity to one another. Thus, they are identified E32 as objects that cannot be placed in proximity to one another. Therefore, it is determined that proximity of these objects is undesired, or in other words that they cannot be present simultaneously in the geographical region Z.

Next, the base station 1R generates E4 an alert message ALT intended to warn of the undesired presence of the first object O1 in the geographical region Z.

In one embodiment, the alert message ALT is rendered on the base station 1R, and may also be addressed to the terminal 2E to warn a user of the terminal 2E of the undesired presence of the first object O1.

In other embodiments, the alert message ALT may be addressed to other terminals and/or to the monitoring server in order to be rendered thereby.

If the identification datum Id1, Id2 relating to at least one of two objects O1, O2 is not present in the list L3 of identification data, it is determined that proximity of these objects O1, O2 is possible. In other words, the objects O1, O2 are identified as being able to be placed in proximity. Thus, storage in proximity of these objects is possible.

In this case, as for the embodiment of FIG. 3a, an information message MESS may be generated and addressed to the terminal 2E and to the monitoring server 3.

Figure 4A:
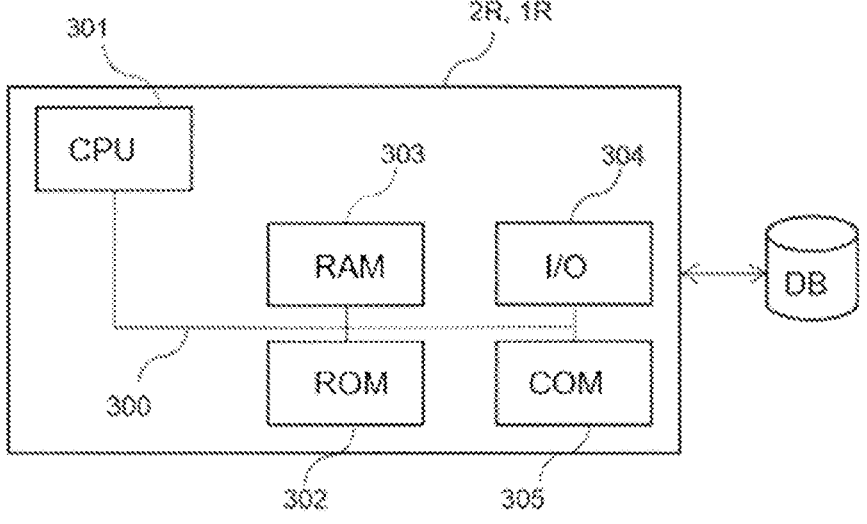
FIG. 4*a* illustrates a hardware architecture able to implement the monitoring method according to the invention.

FIG. 4a schematically illustrates a hardware architecture of a receiver device able to implement the monitoring method according to the invention. According to embodiments, the receiver device 2 may be a terminal (FIG. 1) or a base station (FIG. 2) or another network equipment.

The receiver device 2R, 1R comprises a communication bus 200 to which are connected:
- a processing unit 201, called CPU in the figure (CPU standing for Central Processing Unit), possibly comprising one or more processors;
- a non-volatile memory 202, for example a read-only memory (ROM), an electrically erasable programmable read-only memory (EEPROM) or a flash memory;
- a random-access memory 203 or RAM;
- an input/output interface 204, called I/O in the figure, for example keys or buttons, a screen, a keypad, a mouse or another pointing device such as a touchscreen or a remote controller allowing a user to interact with a receiver device 2R, 1R via a graphical interface or a human-machine interface; and
- communication interfaces 205, called COM in the figure, suitable for exchanging data for example with the emitter device, with objects O1, O2 bearing backscatter tags T1, T2 or with a monitoring server via a communication network 10.

The random-access memory 203 contains registers suitable for storing variables and parameters that are created and modified during the execution of a computer program comprising instructions for implementing the monitoring method according to the invention. The instruction codes of the program stored in the non-volatile memory 202 are loaded into the memory RAM 203 in order to be executed by the processing unit CPU 201.

The non-volatile memory 202 is for example a rewritable EEPROM memory or flash memory able to form a medium within the meaning of the invention, i.e. able to comprise a computer program comprising instructions for implementing the monitoring method according to the invention. The rewritable memory may contain lists listing the objects present in a geographical region and/or lists of identification data used to implement the invention. A plurality of lists of identification data may be stored. According to embodiments, a list may be a list of identification data relating to objects the presence of which in the geographical region is desired, a list of identification data relating to objects the presence of which in the geographical region is undesired, or a list of identification data relating to objects the proximity of which to each other is undesired.

Figure 4B:
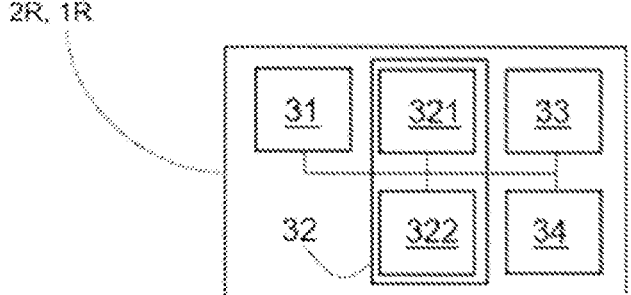
FIG. 4*b* is a functional depiction of a receiving device according to one embodiment of the invention.

This program defines, by way of its instructions, functional modules of the receiver device 2R, 1R that are implemented by and/or control the hardware elements described above. FIG. 4b is a functional representation of a receiver device 2R, 1R according to one embodiment.

These modules especially comprise:
- a reception module 31 configured to receive backscattered signals respectively originating from objects comprising tags backscattering ambient signals, the backscattered signals respectively comprising identification data relating to said objects; and
- a determination module 32 configured to determine, depending on the received identification data relating to said objects, a desired presence or an undesired presence of said objects in a geographical region or an undesired proximity of at least two objects.

According to embodiments, the determination module, which is used to determine desired or undesired presence, comprises
- a verification module 321 configured to verify the presence of the identification datum in a list L1; L2; L3 of identification data; and
- an identification module 322 configured to identify the object as being of desired presence or undesired presence depending on the result of the verification.

Furthermore, according to embodiments, the receiver device 2R, 1R comprises:
- a transmission module 33 configured to transmit, to a monitoring server, the identification datum contained in the first backscattered signal, and the identification datum contained in the second backscattered signal; and
- a generation module 34 configured to generate an alert message ALT intended to warn of the undesired presence of the first object in said geographical region or of the undesired proximity of the first and second objects.

The aforementioned modules and means are controlled by the processor of the processing unit 301. They may take the form of a program able to be executed by a processor, or a hardware form, such as an application-specific integrated circuit (ASIC), a system on chip (SoC), or a programmable logic circuit-type electronic component, such as an FPGA (for "field-programmable gate array") component.

The emitter device 1E, 2E also comprises a communication bus to which are connected a processing unit or microprocessor, a non-volatile memory, a random-access memory or RAM, and a communication interface suitable especially for exchanging data with the receiver device.

Thus, by virtue of the invention, an object located by mistake in a geographical region, or a dangerous situation due to proximity of two objects, may be avoided without deploying expensive monitoring systems and consuming large amounts of power. Specifically, the system according to the invention, since it uses backscatter of ambient signals, does not consume large amounts of power. Furthermore, the monitoring system according to the invention uses equipment already present in networks and only requires backscatter tags by way of additional equipment. Since these backscatter tags are not expensive, implementation of the monitoring system according to the invention does not engender large expenses.

Although the present disclosure has been described with reference to one or more examples, workers skilled in the art will recognize that changes may be made in form and detail without departing from the scope of the disclosure and/or the appended claims.

The invention claimed is:

1. A method for monitoring objects, the objects comprising tags that backscatter ambient signals, the method being implemented by a receiver device and comprising, after obtaining a list comprising identification data relating to objects, a proximity of which to one another is undesired:

receiving a first backscattered signal originating from a first object, the first backscattered signal corresponding to at least one first ambient signal and comprising a first message containing a first identification datum relating to the first object;

receiving at least one second backscattered signal originating from at least one second object, said second backscattered signal corresponding to at least one second ambient signal and comprising at least one second message containing a second identification datum relating to said at least one second object; and determining an undesired presence of said first object depending on a geographical proximity of said first object to said at least one second object, and on a presence of the at least one first and second identification data in said obtained list.

2. The monitoring method as claimed in claim 1, comprising transmitting to a monitoring server said first identification datum contained in said first backscattered signal.

3. The monitoring method as claimed in claim 1, comprising transmitting to a monitoring server said second identification datum contained in said second backscattered signal.

4. The monitoring method as claimed in claim 1, comprising generating an alert message to warn of an undesired geographical proximity of said first object and said at least one second object.

5. A receiver device comprising:

at least one processor; and at least one non-transitory computer readable medium comprising instructions stored thereon which when executed by the at least one processor configure the receiver device to, after obtaining a list comprising identification data relating to objects, a proximity of which to one another is undesired:

receive a first backscattered signal originating from a first object comprising a tag that backscatters at least a first ambient signal and a first message containing a first identification datum relating to the first object;

receive at least one second backscattered signal originating from at least one second object comprising a tag that backscatters at least a second ambient signal and a second message containing a second identification datum relating to the second object; and determine an undesired presence of said first object depending on a geographical proximity of said first object to said at least one second object, and on a presence of the at least one first and second identification data in said obtained list.

6. A system for monitoring objects comprising tags that backscatter ambient signals, said system comprising:

an emitter device that emits ambient signals; and the receiver device of claim 5.

7. A non-transitory computer readable data medium on which is stored a computer program comprising code instructions for implementing a method for monitoring objects when the computer program is executed by at least one processor of a receiver device, the objects comprising tags that backscatter ambient signals, and the method comprising, after obtaining a list comprising identification data relating to objects, a proximity of which to one another is undesired:

receiving a first backscattered signal originating from a first object, the first backscattered signal corresponding to an ambient signal and comprising a first message containing a first identification datum relating to the first object;

receiving at least one second backscattered signal originating from at least one second object, said second backscattered signal corresponding to at least one second ambient signal and comprising at least one second message containing a second identification datum relating to said at least one second object; and determining an undesired presence of said first object depending on an undesired presence of said first object on depending on a geographical proximity of said first object to said at least one second object, and on a presence of the at least one first and second identification data in said obtained list.

8. The receiver device as claimed in claim 5, wherein the instructions configure the processor to implement the following:

transmitting to a monitoring server said first identification datum contained in said first backscattered signal.

9. The receiver device as claimed in claim 5, wherein the instructions configure the processor to implement the following:

transmitting to a monitoring server said second identification datum contained in said second backscattered signal.

10. The receiver device as claimed in claim 5, wherein the instructions configure the processor to implement the following:

generating an alert message to warn of an undesired geographical proximity of said first object and said at least one second object.

11. The non-transitory computer readable data medium as claimed in claim 7, wherein the method comprises transmitting to a monitoring server said first identification datum contained in said first backscattered signal.

12. The non-transitory computer readable data medium as claimed in claim 7, wherein the method comprises transmitting to a monitoring server said second identification datum contained in said second backscattered signal.

13. The non-transitory computer readable data medium as claimed in claim 7, wherein the method comprises generating an alert message to warn of an undesired geographical proximity of said first object and said at least one second object.

\* \* \* \* \*